(12) United States Patent
Hagino et al.

(10) Patent No.: US 6,426,160 B1
(45) Date of Patent: Jul. 30, 2002

(54) FUEL CELL DEVICE

(75) Inventors: Hideo Hagino, Otsu; Takashi Yasuo, Hirakata; Yasuo Miyake, Oizumi-machi, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/533,871

(22) Filed: Mar. 24, 2000

(30) Foreign Application Priority Data

Mar. 25, 1999 (JP) .......................................... 11-080977

(51) Int. Cl.$^7$ ................................................. H01M 8/02
(52) U.S. Cl. .......................................... 429/34; 429/39
(58) Field of Search ................................ 429/34, 38, 39

(56) References Cited

U.S. PATENT DOCUMENTS

| | | | | |
|---|---|---|---|---|
| 4,233,146 A | * | 11/1980 | Rothmayer et al. | ......... 204/255 |
| 5,527,634 A | * | 6/1996 | Meacham | ..................... 429/35 |
| 5,541,015 A | * | 7/1996 | Tajima et al. | ................... 429/26 |
| 6,245,453 B1 | * | 6/2001 | Iwase et al. | ................... 429/34 |

* cited by examiner

Primary Examiner—Patrick Ryan
Assistant Examiner—M. Wills
(74) Attorney, Agent, or Firm—Armstrong, Westerman & Hattori, LLP

(57) ABSTRACT

A fuel cell device is provided and includes a plurality of cell units arranged in superposed layers and each comprising a cell having an anode formed on one surface of an electrode member and a cathode formed on the other surface of the electrode member, a fuel-side-plate having a fuel chamber for passing a fuel therethrough, and an oxidant-side-plate having an oxidant chamber for passing an oxidant gas therethrough, an oxidant supply channel for supplying the oxidant gas to the oxidant chamber and an oxidant discharge channel for releasing to the outside air an oxidant exhaust gas discharged from the oxidant chamber, the cell being sandwiched between the plates. The oxidant discharge channel has a first opening in communication with the oxidant chamber and a second opening in communication with the outside air, the second opening being smaller than the first opening in width.

7 Claims, 5 Drawing Sheets

FUEL CELL DEVICE

FIELD OF THE INVENTION

The present invention relates to fuel cells, such as solid high polymer fuel cells, phosphoric acid fuel cells and methanol fuel cells, which are operated at a relatively low temperature, and more particularly to improvements in the oxidizer gas discharge channels of oxidizer plates of such cells.

BACKGROUND OF THE INVENTION

Solid high polymer fuel cells, phosphoric acid fuel cells and methanol fuel cells are known as fuel cells which are operated at a relatively low temperature.

Of these fuel cells, the construction of the solid high polymer fuel cell will be described generally with reference to FIG. 1 showing an embodiment of the invention.

FIG. 1 shows a cell unit 10 of a solid high polymer fuel cell device. The cell unit 10 comprises a cell 12 which is held between an oxidizer plate 26 and a fuel plate 56. The fuel cell device usually comprises tens to hundreds of cell units 10.

The cell 12 comprises an electrolytic membrane for use as an electrolytic member 14, an anode 50 formed on one side of the membrane, and a cathode 20 formed on the other side thereof.

The fuel plate 56 has a fuel chamber 54 positioned at the anode side of the cell 12 and formed by gas channels 52 for passing a fuel gas therethrough.

With reference to FIG. 7, the oxidizer plate 26 has an oxidizer chamber 24 formed at the cathode side thereof and comprising gas channels 22 for passing an oxidizer gas therethrough. Communicating with the oxidizer chamber 24 are oxidizer supply channels 28 for introducing an oxidizer gas into the oxidizer chamber 24, and oxidizer discharge channels 30 formed at opposite side to the supply channels 28 for discharging to the atmosphere the oxidizer exhaust gas resulting from a reaction.

With the solid high polymer fuel cell device thus constructed, a fuel gas containing hydrogen gas is supplied to the fuel chamber 54, and air or like oxidizer gas containing oxygen is supplied through the oxidizer supply channels 28 to the oxidizer chamber 24, and an electrochemical reaction between the fuel gas and the oxidizer gas generates an electromotive force and produces water.

The oxidizer exhaust gas discharged from the oxidizer chamber 24 contains the water produced by the reaction and humidifying water (including water migrating from the fuel chamber) admitted for giving moisture to the electrolytic member 14. The oxidizer chamber 24 (reaction zone) in which the electrochemical reaction proceeds generates heat due to the reaction and is therefore less likely permit condensation of water vapor, whereas the oxidizer discharge channel 30 outside the reaction zone has a lower temperature, permitting condensation of water vapor in the oxidizer exhaust gas to block the discharge channel 30. If the discharge channel 30 is blocked, there arises the problem that the oxidizer gas no longer passes through the corresponding gas channel 22, impeding the progress of the electrochemical reaction and impairing the cell performance.

This problem is encountered not only with solid high polymer fuel cells but also with fuel cells, such as phosphoric acid fuel cells and methanol fuel cells, which are operated at a relatively low temperature.

Accordingly, a fuel cell has been disclosed wherein as shown in FIG. 8, a groove extending from an oxidizer supply channel 28 to an oxidizer discharge channel 30 and providing these channels is given a gradually increasing depth to prevent stagnation of water (JP-A No. 138696/1996). However, this structure has the likelihood that in the vicinity of the oxidizer discharge channel 30, the flow channel has an increased cross sectional area, which decreases the speed of flow of the oxidizer gas, rendering water liable to stagnate undesirably. Furthermore, an increase in the depth of the flow channel entails the problem that the oxidizer plate 26 needs to have an increased thickness, giving an increased thickness to the cell unit 10 to make the cell assembly large-sized. If the plate 26 has a thick portion and a thin portion due to the difference in the depth of the flow channel, the cell will have uneven internal resistance in its plane, consequently leading to an uneven distribution of current densities and entailing the likelihood of lower cell voltage.

An object of the present invention is to provide a fuel cell device having oxidizer discharge channels adapted to prevent water from stagnating therein and thereby prevented from being blocked to assure the fuel cell device of an improved cell life and stabilized electricity generating performance.

SUMMARY OF THE INVENTION

To fulfill the above object, the present invention provides a fuel cell device which comprises a plurality of cell units arranged in superposed layers and each comprising a cell having an anode formed on one surface of an electrode member and a cathode formed on the other surface of the electrode member, a fuel plate having a fuel chamber formed by a gas channel for passing a fuel gas therethrough, and an oxidizer plate having an oxidizer chamber formed by a gas channel for passing an oxidizer gas therethrough, an oxidizer supply channel for supplying the oxidizer gas to the oxidizer chamber and an oxidizer discharge channel for releasing to the outside air an oxidizer exhaust gas discharged from the oxidizer chamber, the cell being sandwiched between the two plates, with the fuel chamber facing the anode of the cell and with the oxidizer chamber facing the cathode thereof. The oxidizer discharge channel has a first opening in communication with the oxidizer chamber and a second opening in communication with the outside air, the second opening being smaller than the first opening in width.

When the cell units are arranged approximately horizontally in juxtaposed layers, with the gas channel of the oxidizer chamber positioned approximately horizontally, the oxidizer discharge channel may have its second opening positioned at a lower level than the first opening. In this arrangement, it is also desired that the second opening be smaller than the first opening in width.

The second opening at the outer end of the oxidizer discharge channel has a smaller width than the first opening at the inlet of the discharge channel and therefore increases the gas pressure at the outlet end of the channel, permitting the oxidizer gas to flow out at a higher speed. Even if water vapor condenses in the oxidizer discharge channel, the resulting water is accordingly forced out from the discharge channel without blocking the channel. The increased gas pressure at the outlet end of the discharge channel increases the pressure of the oxidizer gas in gas channels when more than one gas channel is provided, evenly distributing the oxidizer gas over the channels to give a higher cell voltage.

Further with the second opening positioned at a lower level than the first opening, water will move toward the second opening under gravity for discharge to the outside, if formed in the discharge channel on condensation and deposited in the channel. This eliminates the likelihood of the discharge channel becoming blocked.

Because the second opening has a smaller width than the first opening and is positioned at a lower level than the first opening, the water in the discharge channel is drawn off to the outside by virtue of the increased gas pressure and the gravity acting on the water, whereby the discharge channel is prevented from being blocked more reliably.

DESCRIPTION OF THE PREFERRED EMBODIMENTS

Solid high polymer fuel cell devices will be described below. The present invention is applicable also to other fuel cells, such as phosphoric acid fuel cells and methanol fuel cells, which are operated at a relatively low temperature.

Embodiment 1

Figure 1:
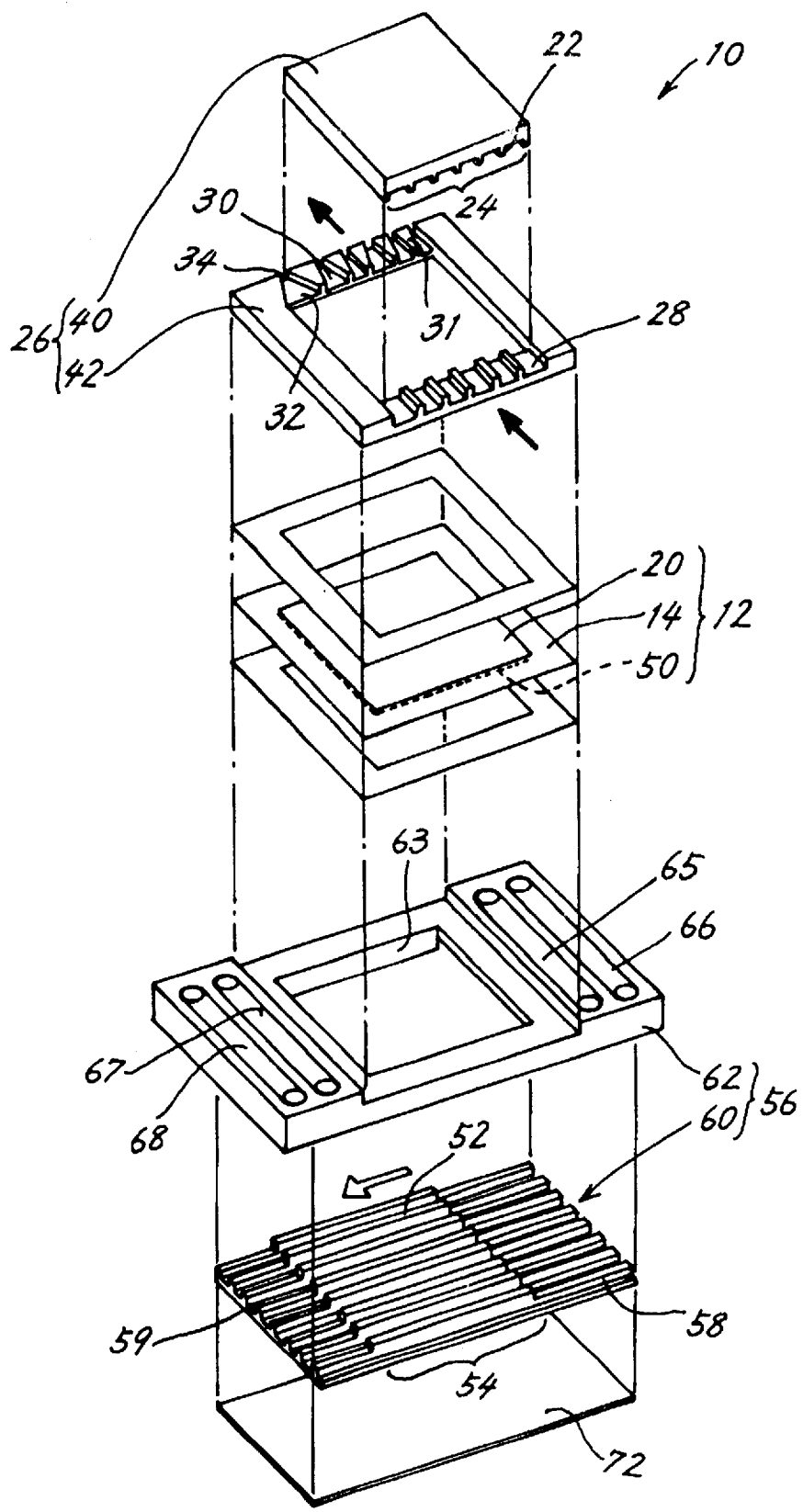
FIG. 1 is an exploded perspective view of a cell unit of a fuel cell device of the invention.

With reference to FIG. 1, a solid high polymer fuel cell device comprises a plurality of cell units 10 arranged in superposed layers and each comprising a cell 12, a fuel plate 56 formed with a fuel chamber 54 to be supplied with a fuel gas, and an oxidizer plate 26 formed with an oxidizer chamber 24 to be supplied with an oxidizer gas. The cell 12 comprises an electrolytic member 14, an anode 50 (positioned at the rear side of the member 14 and therefore indicated in a broken line in FIG. 1) disposed beneath one surface of the electrode member 14, and a cathode 20 disposed on the other surface of the electrode member 14. The cell 12 is sandwiched between the plates 56, 26, with the fuel chamber 54 facing the anode side of the cell 12 and with the oxidizer chamber 24 facing the cathode side thereof. Instead of forming the fuel chamber and the oxidizer chamber in separate plates individually, the fuel chamber can be formed in one surface of a single plate (so-called bipolar plate), and the oxidizer chamber in the other surface thereof.

A seal member for preventing a gas leak is disposed between the cell 12 and each of the plates 56, 26. Incidentally, FIG. 1 shows only one cell unit 10.

An electrolytic membrane comprising an ion exchange membrane, for example, of perfluorocarbonsulfonic acid is used as the electrolytic member 14. The electrodes 50, 20 on the electrolytic member 14 are formed by impregnating a carbon having platinum supported thereon with a 20 wt. % Nafion solution (product of Aldrich Chemical Co.) and 20 wt. % of polytetrafluoroethylene (PTFE). The regions where the electrodes 50, 20 are formed provide electrode reaction regions.

The oxidizer plate 26 comprises a rectangular panel 40 having the oxidizer chamber 24, and a frame 42 surrounding the side edges of the rectangular panel 40. Alternatively the oxidizer plate 26 can be made from a single plate.

The rectangular panel 40 is prepared, for example, from a porous carbon panel. The oxidizer chamber 24 is formed at the position of the reaction region facing the cathode 20. The oxidizer chamber 24 has a plurality of parallel gas channels 22.

The frame 42 is prepared, for example, from perphenylene sulfide resin and formed with oxidizer supply channels 28 and oxidizer discharge channels 30 in communication with the gas channels 22 of the rectangular panel 40.

Figure 2:
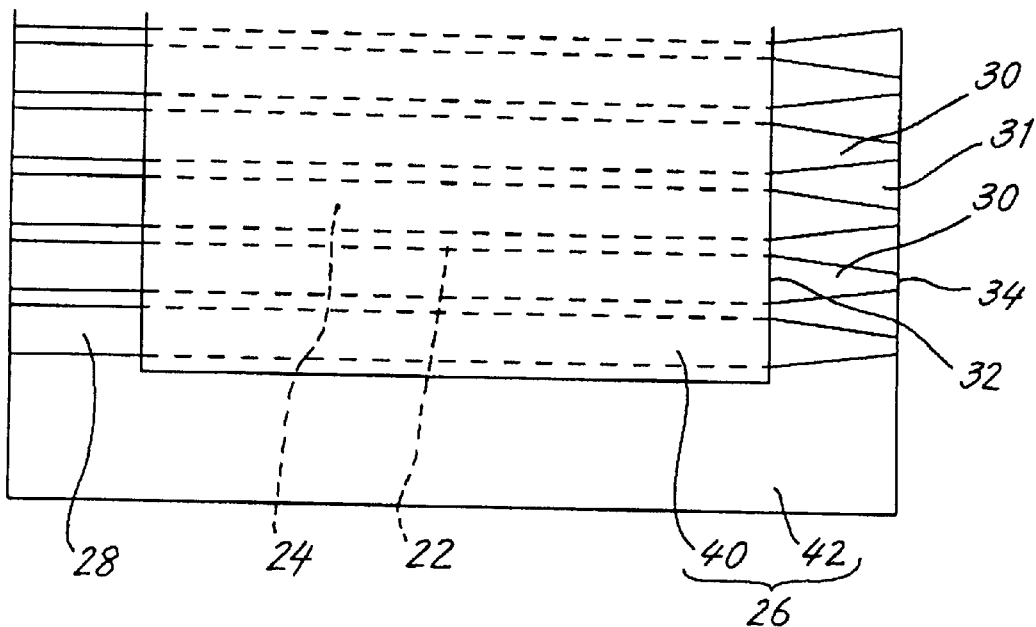
FIG. 2 is a front view showing an oxidizer plate of Embodiment 1.

As shown in FIG. 2, each oxidizer discharge channel 30 has a first opening 32 communicating with the oxidizer chamber 24, and a second opening 34 communicating with the atmosphere. The second opening 34 is made smaller than the first opening 32 in width. For example, the first opening 32 has a width of 2 mm, and the second opening 34 a width of 1 mm.

The fuel plate 56 is formed by fitting a rectangular panel 60 having the fuel chamber 54 into a frame 62.

The rectangular panel 60 is prepared, for example, from a porous carbon panel. The fuel chamber 54 is formed at the position of the reaction region facing the anode 50. The fuel chamber 54 has a plurality of parallel gas channels 52. Each gas channel 52 extends into a fuel supply channel 58 for supplying the fuel gas and into a fuel discharge channel 59 for discharging a fuel exhaust gas.

The frame 62 is prepared, for example, from perphenylene sulfide resin and has an opening 63 for the gas channel portion of the rectangular panel 60 to fit in. The frame 62 is formed at one side of the opening 63 with manifolds 65, 66 for supplying the fuel gas and water to the fuel chamber 54, and at the other side of the opening 63 with manifolds 67, 68 for discharging the fuel exhaust gas and drain water.

The rectangular panel 60 is fitted in the frame 62 along with a partition plate 72 of vitreous carbon to provide the fuel plate 56 (see FIG. 1).

For the generation of electricity, the fuel cell device is so positioned that the direction of superposition of the cell units 10 is approximately horizontal, such that the direction of flow of the oxidizer gas, i.e., the direction of the gas channels of the oxidizer chamber 24, is approximately horizontal as shown in FIG. 2.

With each cell unit 10 thus positioned, the fuel gas and water are supplied from the respective manifolds 65, 66 to the fuel chamber 54 through the fuel supply channels 58, and the oxidizer gas is supplied to the oxidizer chamber 24 through the oxidizer supply channels 28 as by a fan (not shown), whereby electricity is generated.

The fuel exhaust gas and drain water drawn off from the fuel chamber 54 are discharged from the respective manifolds 67, 68. The oxidizer exhaust gas is drawn off from the oxidizer discharge channels 30.

The oxidizer exhaust gas contains the water produced by the reaction and migrating water as described above, and water vapor is likely to condense in oxidizer discharge channels 30 of lower temperature outside the reaction region, whereas since the discharge channel 30 has a smaller width at the second opening 34 than at the first opening 32, the oxidizer exhaust gas flows through the second opening 34 at a higher speed, effectively discharging the water therewith. This obviates the likelihood that the water will stagnate in the discharge channel 30 or the stagnant water will block the channel 30.

According to the invention, the oxidizer gas channels in the reaction region are identical with those of the prior art in width and depth, so that the foregoing structure of the oxidizer discharge channels is unlikely to diminish the reaction area.

The reduction in the width of the second opening 34 at the outer end of the oxidizer discharge channel 30 increases the gas pressure at the second opening 34. The back pressure increases the pressure of the oxidizer flowing in the oxidizer chamber 24 at the upstream side, evenly distributing the oxidizer gas over the channels 22 to give a higher cell voltage.

Embodiment 2

Figure 3:
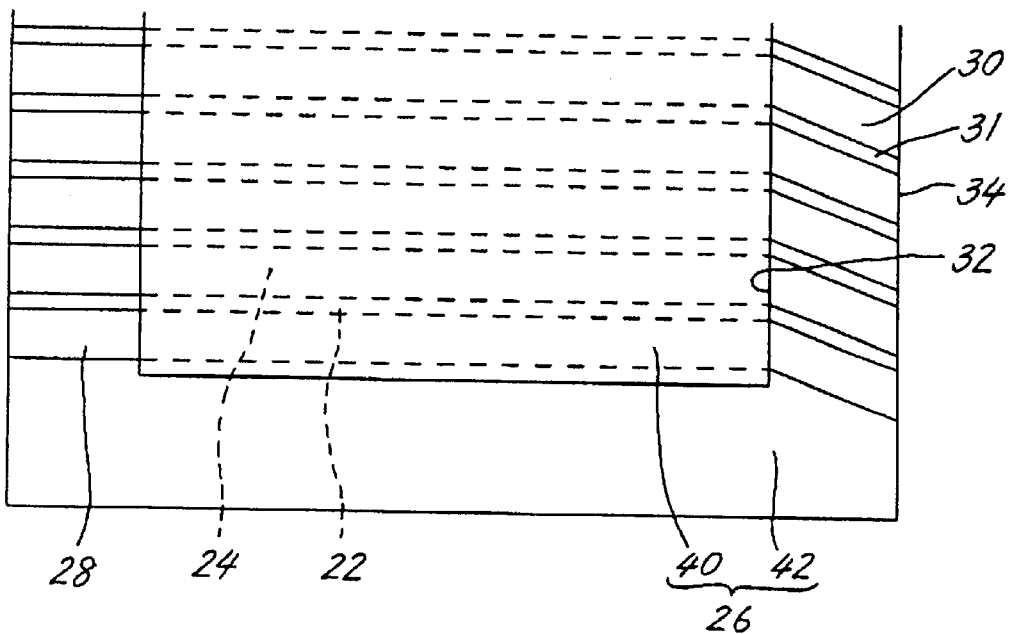
FIG. 3 is a front view showing an oxidizer plate of Embodiment 2.

According to this embodiment, oxidizer discharge channels 30 are constant in width and each formed at the outer end thereof with a second opening 34 which is positioned at a lower level than a first opening 32 as shown in FIG. 3. With the exception of the oxidizer discharge channels 30, the embodiment has the same construction as Embodiment 1 and therefore will not be described further.

Positioning the second opening 34 at a lower level than the first opening 32 permits effective discharge of water condensate by the flow of the oxidizer exhaust gas and the gravity acting on the water even if water vapor condenses in the oxidizer discharge channel 30. This eliminates the likelihood of water stagnating in the discharge channel 30 or stagnant water blocking the channel 30.

Embodiment 3

Figure 4:
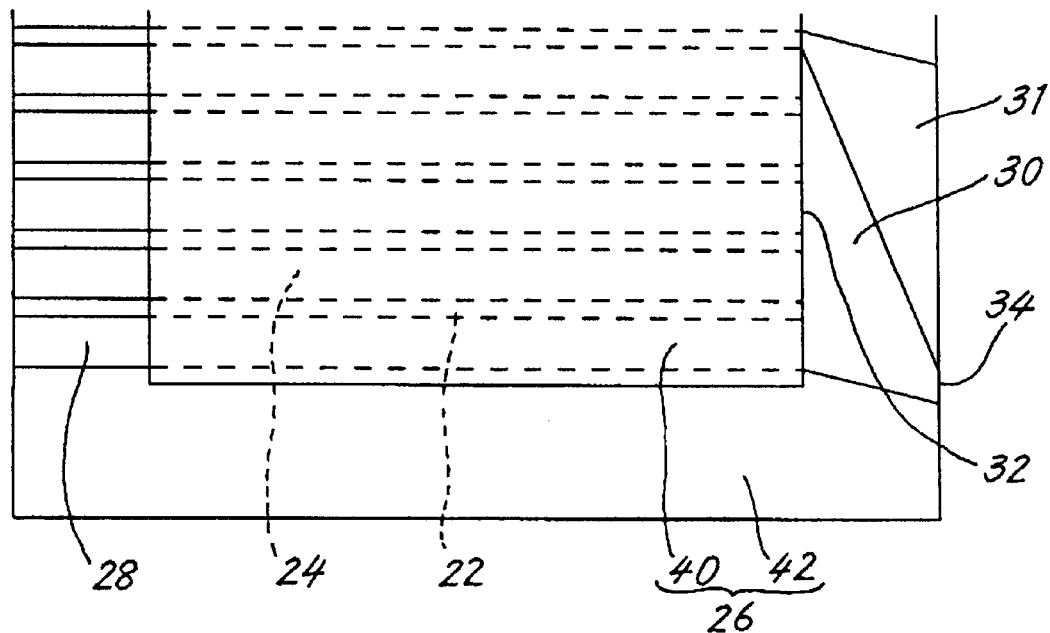
FIG. 4 is a front view showing an oxidizer plate of Embodiment 3.
Figure 5:
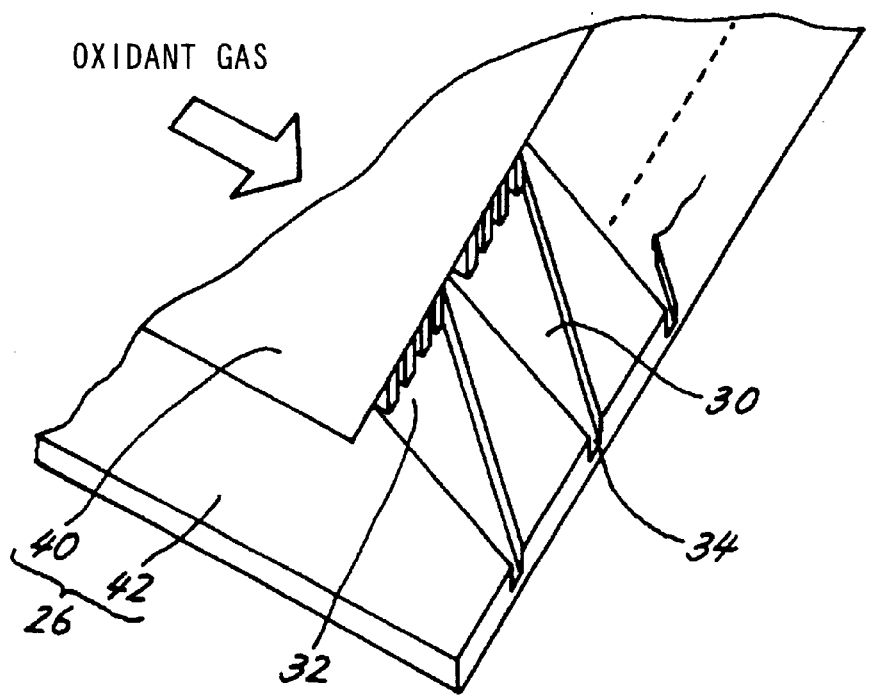
FIG. 5 is a perspective view showing the oxidizer plate of FIG. 4 on an enlarged scale.

With reference to FIGS. 4 and 5 showing this embodiment, oxidizer discharge channels 30 each have a first opening 32 opened to a plurality of gas channels 22. The first opening 32 is illustrated as opened to five gas channels 22. The discharge channel 30 has a second opening 34 which is smaller than the first opening 32 in width and positioned at a lower level than the first opening 32. With the exception of the oxidizer discharge channels 30, the embodiment has the same construction as Embodiment 1 and therefore will not be described further.

The oxidizer discharge channel 30 thus formed serves to further increase the gas pressure at the second opening 34 and also ensures smoother discharge of water utilizing the weight of the water itself.

The second opening 34, which is positioned at a lower level than the first opening 32 according to the present embodiment, can alternatively be formed in a region opposed to the first opening 32.

A rib 31 between the adjacent oxidizer discharge channels 30, 30 assures the oxidizer plate 26 of strength, serving to withstand the pressure of tightening-up required for sealing. Accordingly, it is desired to form at least two oxidizer discharge channels 30 so as to provide at least one rib 31.

Embodiment 4

With Embodiments 1 to 3, the rectangular panel 40 and the frame 42 of different materials are used for providing the oxidizer plate 26. The perphenylene sulfide resin forming the frame 42 has higher water repellency than the porous carbon forming the rectangular panel 40, while the frame 42 which is positioned outside the reaction region has a lower temperature. Water vapor is therefore prone to condensation in the oxidizer discharge channels 30 formed in the frame 42. The water vapor condensed to water in the discharge channel 30 is deposited in the form of globular drops in the channel 30 and is likely to block the channel 30. Accordingly, the oxidizer discharge channels 30 are made equivalent to or lower than the oxidizer chamber 24 in water repellency.

The discharge channels 30 are given lower water repellency by subjecting the portion of the frame 42 formed with the channels 30 to a hydrophilic treatment.

The hydrophilic treatment can be conducted, for example, by spraying a composition comprising 80 wt. % of carbon and 20 wt. % of phenolic resin in mixture onto the channeled portion to form a coating having a thickness of about 40 mm and drying the coating at 120° C. for 1 hour. The hydrophilic treatment thus performed gives the oxidizer discharge channels 30 a water contact angle of 0 degree, permitting water to be deposited in the channels 30, as spread over the channeled wall surface, greatly reducing the possibility that the channels 30 will be blocked.

EXAMPLE

Fuel cell devices each comprising 52 cell units 10 were fabricated by preparing cell units 10 having oxidizer discharge channels 30 of each of Embodiments 1 to 4. The fuel cell devices were used for generating electricity and checked for variations in cell voltage with lapse of time.

The fuel cell device according to Embodiment 4 was fabricated using cell units 10 wherein the hydrophilic treatment was conducted for oxidizer discharge channels 30 of Embodiment 3.

Figure 7:
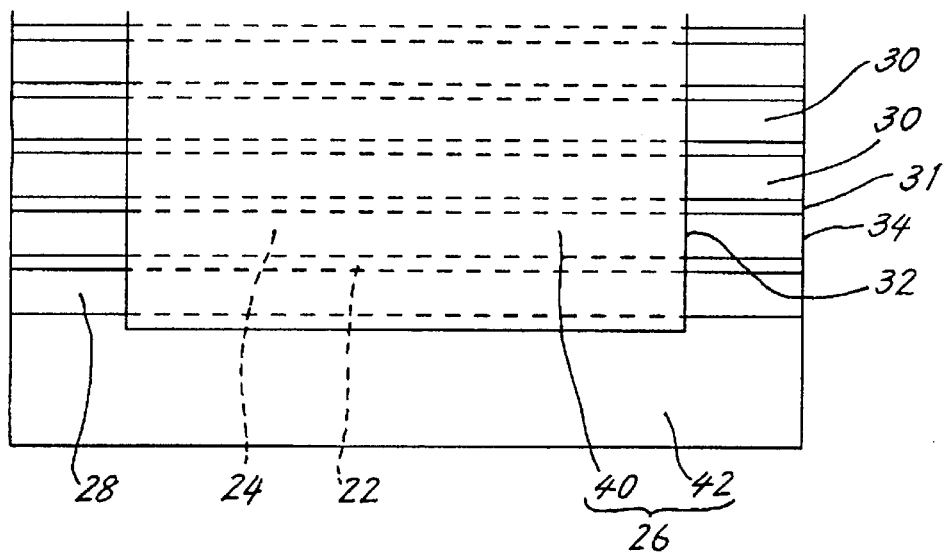
FIG. 7 is a front view showing a conventional oxidizer plate.
Figure 8:
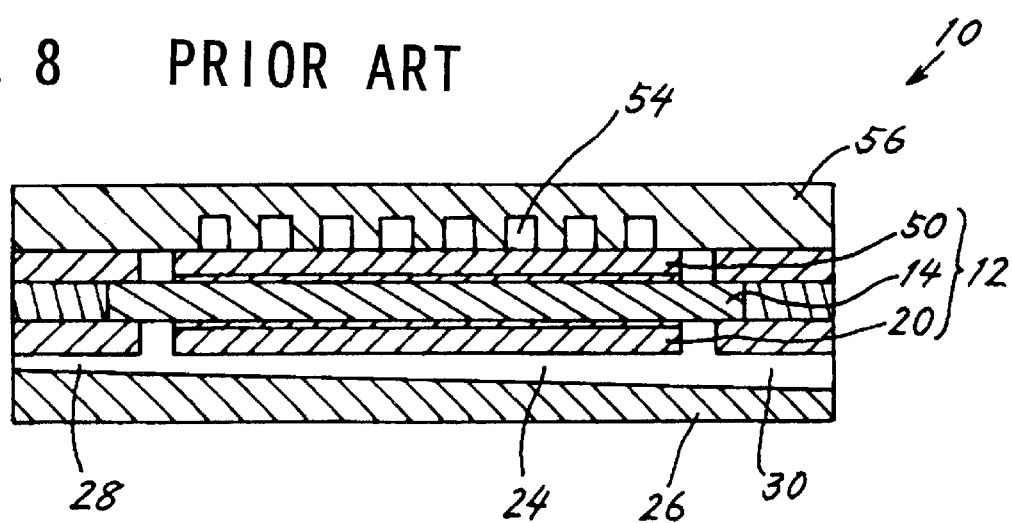
FIG. 8 is a sectional view of a cell unit of a conventional solid high polymer fuel cell device.

For comparison, a fuel cell device was fabricated, as Comparative Example, with use of oxidizer plates 26 wherein the oxidizer discharge channels 30 were constant in width and each had openings 32, 34 as positioned at the same level as seen in FIG. 7.

The test conditions are as follows.

Electrode effective area: 100 $cm^2$

Current density: 400 $mA/cm^2$

Cell temperature (electrode center portion): 70° C.

Percentage of fuel to be consumed: 95% (hydrogen gas)

Percentage of oxidizer to be consumed: 40% (air)

Figure 6:
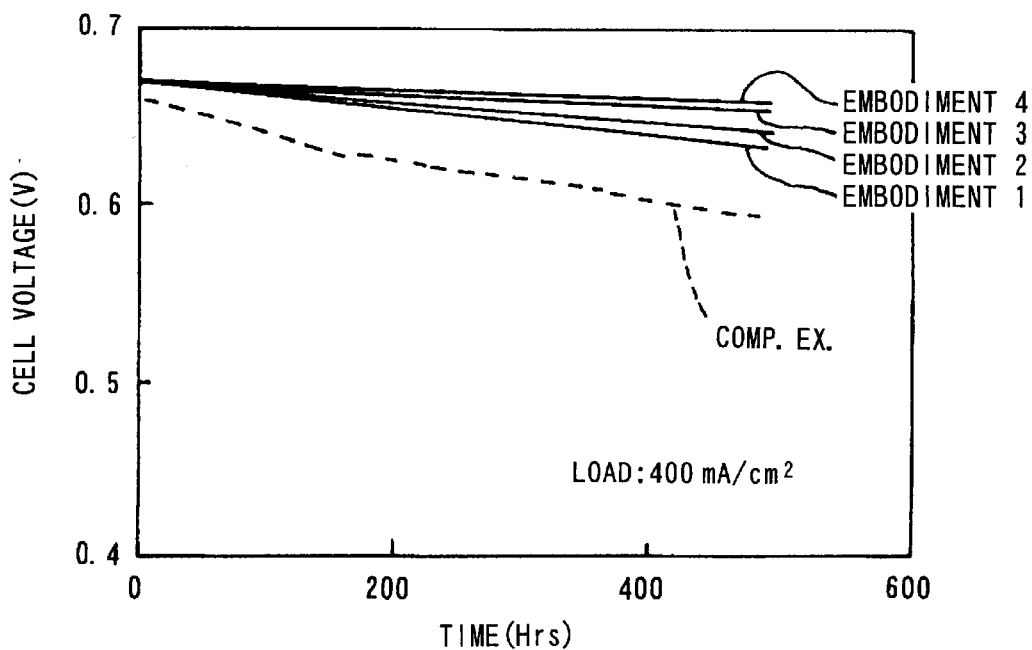
FIG. 6 is a graph showing the measurements of cell voltage.

FIG. 6 shows the measurements of cell voltage.

FIG. 6 reveals that Embodiments 1 to 4 are higher than Comparative Example in cell voltage and remain stable over a prolonged period of time.

The embodiments described above are solid high polymer fuel cell devices embodying the invention, whereas the invention is not limited only to solid high polymer fuel cells but is of course applicable also to fuel cells, such as phosphoric acid fuel cells and methanol fuel cells, which are operated at a relatively low temperature to exhibit similar effect and advantage.

The electrolytic member to be used for phosphoric acid fuel cells is, for example, a ceramic member having phosphoric acid or like electrolyte supported thereon. The electrolytic member to be used for methanol fuel cells is, for example, a nonwoven fabric impregnated with an alkali electrolyte.

Apparently, the present invention can be altered or modified by one skilled in the art without departing from the spirit of the invention. Such modifications are included within the scope of the invention as set forth in the appended claims.

What is claimed is:

1. A fuel cell device comprising a plurality of cell units arranged in superposed layers and each comprising:

a cell having an anode formed on one surface of an electrolytic member and a cathode formed on the other surface of the electrolytic member, a fuel plate having a fuel chamber formed by a gas channel for passing a fuel gas therethrough, and an oxidizer plate having an oxidizer chamber formed by a gas channel for passing an oxidizer gas therethrough, an oxidizer supply channel for supplying the oxidizer gas to the oxidizer chamber and an oxidizer discharge channel for releasing to the outside air an oxidizer exhaust gas discharged from the oxidizer chamber, the cell being sandwiched between the plates, with the fuel chamber facing the anode of the cell and with the oxidizer chamber facing the cathode thereof, each cell of the fuel cell device being characterized in that the oxidizer discharge channel has a first opening in communication with the oxidizer chamber and a second opening in communication with the outside air, the second opening being smaller than the first opening in width, in order to increase a gas pressure at an outlet end of the oxidizer discharge channel, permitting the oxidizer gas to flow out at a higher speed.

2. The fuel cell device according to claim 1 wherein the cell units are arranged approximately horizontally in juxtaposed layers and the gas channel providing the oxidizer chamber is positioned approximately horizontally, the oxidizer discharge channel having its second opening positioned at a lower level than the first opening.

3. The fuel cell device according to claim 1 wherein the first opening is opened to a plurality of gas channels providing the oxidizer chamber.

4. The fuel cell device according to claim 1 wherein the oxidizer discharge channel is equivalent to or lower than the oxidizer chamber in water repellency.

5. A fuel cell device comprising a plurality of cell units arranged approximately horizontally in juxtaposed layers and each comprising:

a cell having an anode formed on one surface of an electrolytic member and a cathode formed on the other surface of the electrolytic member, a fuel plate having a fuel chamber formed by a gas channel for passing a fuel gas therethrough, and an oxidizer plate having an oxidizer chamber formed by a gas channel for passing an oxidizer gas therethrough approximately horizontally, an oxidizer supply channel for supplying the oxidizer gas to the oxidizer chamber and an oxidizer discharge channel for releasing to the outside air an oxidizer exhaust gas discharged from the oxidizer chamber, the cell being sandwiched between the plates, with the fuel chamber facing the anode of the cell and with the oxidizer chamber facing the cathode thereof, each cell of the fuel cell device being characterized in that the oxidizer discharge channel has a first opening in communication with the oxidizer chamber and a second opening in communication with the outside air, the second opening positioned at a lower level than the first opening, in order for water to be moved toward the second opening under gravity for discharge to the outside, if formed in the oxidizer discharge channel on condensation and deposited in the oxidizer discharge channel.

6. The fuel cell device according to claim 5 wherein the first opening is opened to a plurality of gas channels providing the oxidizer chamber.

7. The fuel cell device according to claim 5 wherein the oxidizer discharge channel is equivalent to or lower than the oxidizer chamber in water repellency.

* * * * *